United States Patent [19]

Gregoire et al.

[11] Patent Number: 4,603,707

[45] Date of Patent: Aug. 5, 1986

[54] PURGE BLOCK FOR GAS SYSTEMS

[75] Inventors: Roger J. Gregoire; Bruce Huling, both of Phoenix, Ariz.

[73] Assignee: Motorola, Inc., Schaumburg, Ill.

[21] Appl. No.: 519,639

[22] Filed: Aug. 2, 1983

[51] Int. Cl.[4] ............................................. F16K 37/00
[52] U.S. Cl. .................................... 137/557; 137/554; 137/597; 137/887; 116/268; 116/269; 116/273; 73/196; 200/81.9 M; 340/611
[58] Field of Search ............... 137/861, 887, 557, 599, 137/561 R, 597, 554; 200/81.9 M; 340/611, 606; 73/196, 861.52; 116/268, 269, 273

[56] References Cited

U.S. PATENT DOCUMENTS

| | | | |
|---|---|---|---|
| 2,150,077 | 3/1939 | Oehler | 137/599 |
| 2,529,605 | 11/1950 | Gustafson | 137/556.6 |
| 2,791,657 | 5/1957 | Bloxsom et al. | 200/81.9 M |
| 2,833,298 | 5/1958 | Shannon | 73/196 |
| 3,010,316 | 11/1961 | Snyder | 137/599 |
| 3,083,577 | 4/1963 | Nelson et al. | 137/599 |
| 3,095,888 | 7/1963 | Kline et al. | 137/599 |
| 3,153,934 | 10/1964 | Reilly | 340/611 |
| 3,230,972 | 1/1966 | Davis, Jr. | 137/599 |
| 3,477,467 | 11/1969 | Sewell et al. | 137/599 |
| 3,742,970 | 7/1973 | Gross | 116/268 |
| 3,963,043 | 6/1976 | Cota et al. | 137/557 |
| 4,101,874 | 7/1978 | Denison et al. | 340/606 |
| 4,152,925 | 5/1979 | Lindh | 73/196 |
| 4,181,835 | 1/1980 | Stadler et al. | 340/611 |
| 4,281,683 | 8/1981 | Hetherington et al. | 137/887 |

FOREIGN PATENT DOCUMENTS

| | | | |
|---|---|---|---|
| 645192 | 7/1962 | Canada | 200/81.9 M |
| 2307188 | 9/1974 | Fed. Rep. of Germany | 137/561 R |
| 0507120 | 12/1979 | U.S.S.R. | 200/81.9 M |

OTHER PUBLICATIONS

Chem-Tec, "High Reliability Close Differential Adjustable Flow Switch", Chem-Tec Equipment Co., Fla., Models 125, 500, 1983.
Silsco, "Silsco Moniter Purge Assembly and Control Box," Silsco, 1983.
Chem-Tec, "Flow Signal Valve", Chem-Tec Equipment Co., Fla., 1983.
Chem-Tec, "Flow Switch", Chem-Tec Equipment Co., Fla., Supersensitive, FAV Series, 500, 1983.

Primary Examiner—A. Michael Chambers
Attorney, Agent, or Firm—Joe E. Barbee

[57] ABSTRACT

IA purge block is disclosed in which inlet, process, purge and vent ports are series connected in a ring or bridge. The channel or passageway connecting the inlet and purge ports comprises a flow sensor. The impedance to gas flow of each channel is different from the others. The impedances are chosen such that improper operating conditions cause an imbalance in the flow which is detected by the flow sensor. During normal operation of the system in which the purge block is used, the flow sensor acts as an excess flow detector by comparing the flow through itself with the flow through a parallel, but more restrictive, path within the purge block.

21 Claims, 4 Drawing Figures

PURGE BLOCK FOR GAS SYSTEMS

BACKGROUND OF THE INVENTION

This invention relates to gas handling systems and, in particular, to what is known as a purge block.

In the fabrication of semiconductor devices, and other applications, gases are used which are toxic, flammable, corrosive, explosive, or even some combination of these. While many precautions are taken with the use of such gases, the most difficult situation with which one must cope is the disconnection of the "bottles", i.e. the pressurized metal containers. Supply lines and connecting fittings all contain residual amounts of gas which must be purged before the bottle is disconnected from the system.

To this end, a purge block is provided. To date, a purge block has been simply a fitting at the nexus of a supply line from the bottle, a supply line to the process equipment which uses the gas, a supply line for an inert gas, and a vent or vacuum line. Arrayed about the purge block are three valves, one connected to each of the latter three lines. To disconnect the gas bottle, one typically closes the valve to the process line and the valve on the bottle and then opens the valve to the vacuum line to evacuate the block, then closes the vacuum line valve and opens the valve to the inert gas line, then closes the valve to the inert gas line. After several cycles, the bottle is then disconnected. The number of cycles depends upon the nature of the gas, the volume to be purged, and the absolute pressures in the vacuum and inert gas lines.

While disconnection of the bottle is the most difficult situation, it is not the only time the condition of the gas delivery system must be monitored. The system is monitored continuously, e.g. for bad fittings, regulators, or valves and for human error, all of which usually result in an excess gas flow.

To cope with this, a number of sensors, safety valves and the like have been added, to the point that the purge block and its associated hardware occupy a considerable amount of space in the gas cabinet where the bottles are stored. This is particularly a problem where several bottles, of the same gas or different gases, are stored in the same cabinet. The increase in hardware also increases the chance a mistake may be made and increases the volume to be purged before a bottle can be disconnected. The cost associated with a gas cabinet of the prior art is not insignificant either since the additional components and fittings are quite expensive.

A problem with this proliferation of paraphernalia is the number of connections, particularly those connections the integrity of which is not monitored. While a variety of solutions have been proposed or even implemented, the problem remains that the gas cabinet is a complex, expensive piece of equipment.

Another problem with the systems of the prior art is that the flow sensors in such systems interpret the initial venting or excess purge flow as a system failure. The result is more than the disconcerting sound of an alarm. There is an automatic shutdown which must be reset before the cabinet can be placed back on line. The net result is increased downtime and expense.

One solution to the problem of false alarms is to use an electronic time delay, i.e. the alarm condition is not recognized unless it persists for some predetermined period of time, e.g. three seconds. A problem with this approach is that, if the alarm is real, no corrective action is taken for that same period of time.

Maintenance and/or repair is also a problem since there are so many separate pieces in the cabinet. Joints are not intended to be opened and closed frequently. The individual components can be inspected in the cabinet to some degree, but cannot be fully tested unless removed. The result is that maintenance or repair more closely resembles rebuilding the system.

In view of the foregoing, it is therefore an object of the present invention to provide an improved purge block.

Another object of the present invention is to provide a purge block which incorporates sense means for sensing system failures or human errors around itself or in the process line.

A further object of the present invention is to reduce the volume which must be purged before the bottle of reactant gas is disconnected.

Another object of the present invention is to reduce the space taken up by the purge block and associated sense apparatus in a gas cabinet.

A further object of the present invention is to simplify the gas handling apparatus in a gas cabinet.

Another object of the present invention is to simplify the repair and/or maintenance of a gas cabinet.

A further object of the present invention is to reduce the number of unprotected connections in a gas cabinet.

Another object of the present invention is to eliminate false alarms during purging.

A further object of the present invention is to provide an immediate alarm and shutdown if improper conditions exist.

SUMMARY OF THE INVENTION

The foregoing objects are achieved in the present invention in which the purge block comprises four ports and an internal chamber connected in series in a ring or bridge having four arms or sides. Inlet and process ports are located on diagonally opposed corners, as are purge and vent ports. The chamber is provided in the arm connecting the inlet and purge ports. A flow sensor, positioned in the chamber, partially fills the cross-sectional area of the chamber such that gas flow through the chamber is restricted. The restriction to flow imposed by each arm is preset so that an improper flow will cause the sensor to move within the chamber, tripping an alarm.

BRIEF DESCRIPTION OF THE DRAWINGS

A more complete understanding of the present invention can be obtained by considering the following detailed description in conjunction with the accompanying drawings, in which.

DETAILED DESCRIPTION OF THE PREFERRED EMBODIMENT

Figure 1:
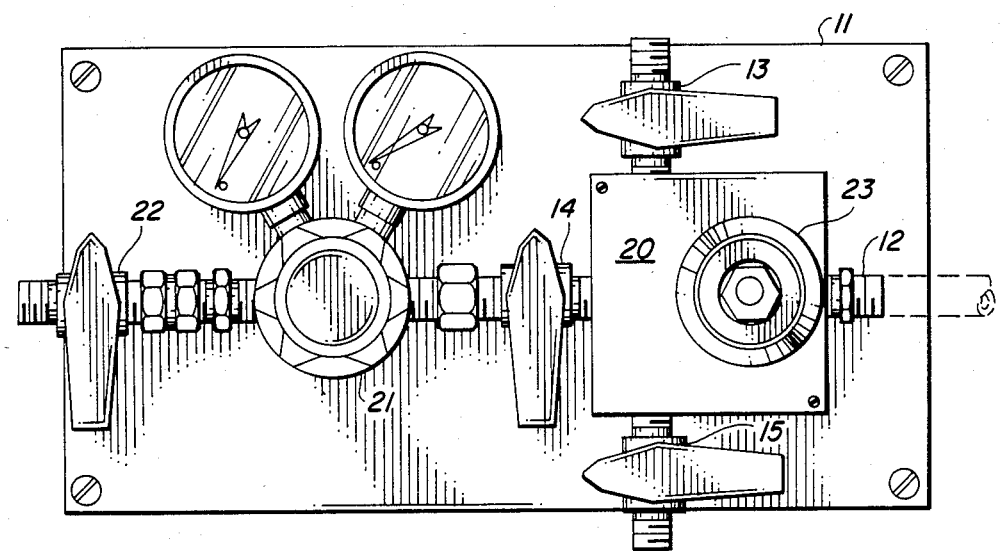
FIG. 1 illustrates a preferred embodiment of the present invention.

FIG. 1 illustrates a preferred embodiment of the present invention as it would appear in a gas panel in a gas cabinet. Specifically, purge block 20 is attached to base 11 and has connector fitting 12 attached to the inlet port thereof. A bottle of gas, not shown, under high pressure, e.g. two thousand pounds per square inch, is attached by way of a suitable coupling to connector 12. Shut-off valve 13 is attached to the purge port of block 20 and is connected to a source of purge gas, not shown, such as nitrogen. Valve 14 is connected to the process port of purge block 20 and serves to connect purge block 20, by way of regulator 21 and shut-off valve 22, to the equipment which will use the reactive gas supplied by way of purge block 20. Shut-off valve 15 is connected to the vent port of purge block 20 and is connected by suitable conduit to a vacuum system or vent line for withdrawing gases from purge block 20. High pressure valve 23, built into the front of purge block 20, provides an emergency shut-off of the process gas in the event of an alarm.

Base 11 thus contains several valves and fittings as well as purge block 20 and comprises a modular unit which can be readily withdrawn from the cabinet for repair or maintenance. As more fully described hereafter, many sense functions are performed by purge block 20, which substantially simplifies the construction of the gas cabinet by eliminating the flow sensors which are normally attached to the purge block. In a gas cabinet system in accordance with the present invention, it is feasible to perform maintenance periodically by simply removing base 11 and replacing it with a similar base which has been fully reconditioned and tested. The substitution of one module for the other can be carried out in a relatively short time, thereby decreasing the downtime of the cabinet.

Figure 2:
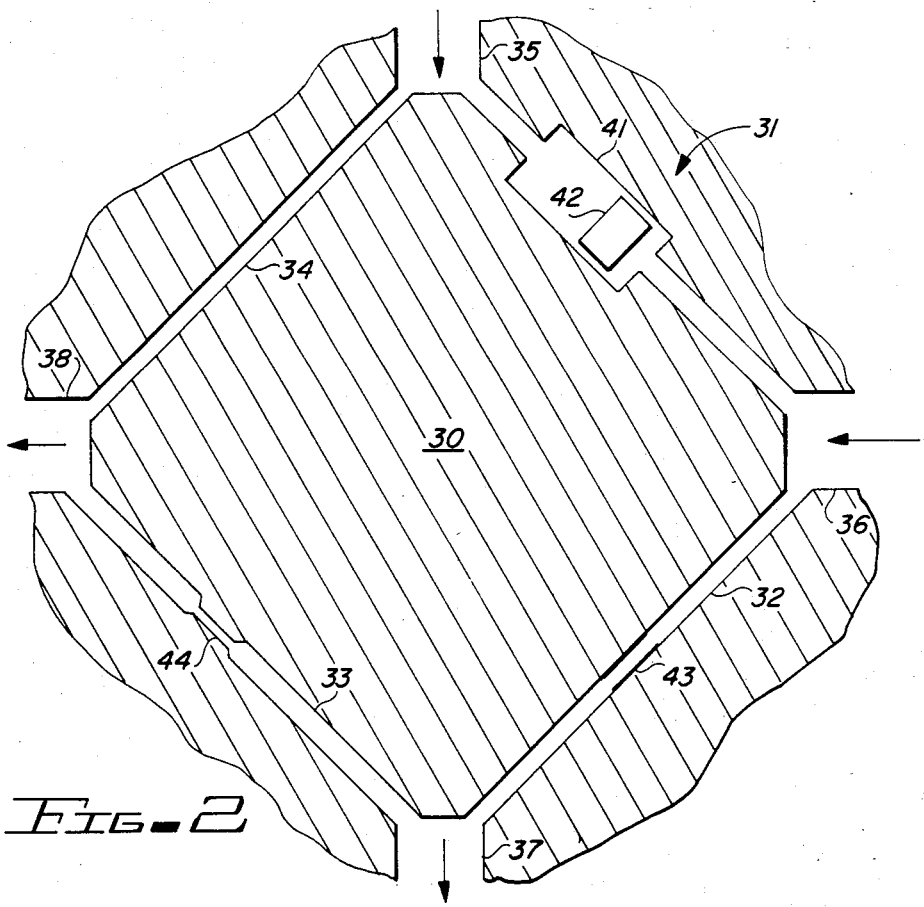
FIG. 2 illustrates schematically the gas flow in accordance with the present invention.

FIG. 2 schematically illustrates the gas flow and operation within purge block 20 of FIG. 1. Specifically, the purge block comprises a ring or bridge 30 having four arms or segments, 31-32-33-34, serially connecting ports 35-36-37-38, respectively. Port 35 corresponds to the purge port of FIG. 1 and port 36 corresponds to the supply port of FIG. 1. Port 37 corresponds to the vent port of FIG. 1, while port 38 corresponds to the process port of FIG. 1.

In normal operation, the reactive gas enters port 36 and divides between arms 31 and 32 flowing to port 38 by way of arms 33 and 34. Valves 13 and 15, as illustrated in FIG. 1, are closed and, absent an error condition, the purge block functions simply as a connection between the bottle of gas and the process equipment.

Each of the arms in ring 30 exhibits a different impedance to the flow of gas. Arm 33 has a higher impedance to the flow of gas than arm 31, which, in turn, has a higher impedance than arm 32, which, in turn, has a higher impedance than arm 34. Arms 32 and 33 are provided with a predetermined impedance by way of constrictions 43 and 44 respectively. Constriction 44 is narrower than constriction 43, thereby increasing the impedance of arm 33 to the flow of gas.

Arm 31 comprises chamber 41 having mass 42 therein which substantially, but not completely, fills the cross-sectional area of chamber 41. Gas from port 36 can thus flow around mass 42 to ports 35 and 38. Mass 42 can move within elongated chamber 41 but is held in place at the lower end, e.g. by way of a resilient spring, magnetic means, gravity, or static friction. Since the impedance of arms 31 and 34 is lower than that of arms 32 and 33, which are connected in parallel, the gas flow through arms 31 and 34 is greater than the flow through arms 32 and 33.

If the gas flow exceeds a predetermined rate, the pressure drop across mass 42 will become sufficient to move mass 42 from the lower end of chamber 41 to the upper end. Suitable sense means at the lower end, upon detecting the absence of mass 42 at that end, signals an alarm so that the system can be shut down to determine the cause of the excess flow. The detection of the movement of mass 42 can be readily accomplished optically, electrically, or magnetically. As more fully described in connection with FIG. 3, in a preferred embodiment of the present invention, the sensing is carried out magnetically. Thus purge block 30 acts as an excess flow sensor for the process gas, thereby eliminating one external sensor.

When the supply of gas in the bottle of reactant gas is nearly depleted, the bottle is taken off-line by closing the valve at the top of the bottle and closing valve 14 which is connected to process port 38. The bottle of reactant gas cannot be simply disconnected at this point because the passageways within purge block 30 as well as the line connecting purge block 30 to the bottle of gas all contain reactant gas which must be removed before the bottle is disconnected.

In order to do this, valve 15, as illustrated in FIG. 1, is opened, thereby venting the purge block and the line connected to the bottle. Prior art systems, which had an excess flow sensor between the bottle and the purge block, would sense this condition as an error and sound an alarm. As previously noted, the remedy, of sorts, was to provide a time delay in the alarm since the venting of the purge block and associated lines was a momentary overflow condition. As noted, in the event of a genuine overflow condition the time delay could permit excess gas to flow unnecessarily.

In the present invention, the excess flow sensor is not tripped by the venting of the purge block. Since arm 33 has a higher impedance to gas flow than arm 32, the residual gas will be removed more slowly from port 38, arm 34, port 35, and the upper end of chamber 41. Thus, the pressure on the upper side of mass 42 will be greater than the pressure on the lower side of mass 42 and mass 42 will not move upwardly. If the vent valve is opened while the valve from the bottle is open, the pressure in port 36 is higher than the pressure in port 35. This forces mass 42 to the upper end of chamber 41, thereby signalling an excess flow error condition which can be used to close high pressure valve 23.

The response of the flow sensor in accordance with the present invention is virtually instantaneous, on the order of milliseconds. The actual time depends upon the applied force (the pressure difference across and the cross-sectional area of mass 42), the restoring (opposing) force, if any, the mass of mass 42, the distance to be travelled, and the response time of the means for sensing the absence of mass 42 at the lower end of chamber 41.

In the next step of the purge cycle, the vent valve is closed and the purge valve is opened, thereby filling purge block 30 and the line connecting it to the bottle with an inert gas. The purge valve is then closed and the vent valve opened to remove this gas and the process is repeated to assure a low concentration of reactant gas in the system.

Since the reactant gas is typically at a higher pressure than the purge gas, even when the bottle is nominally empty, the flow sensor incorporated into the purge block will sense an excess flow from port 36 to port 35, thereby providing an alarm indication and preventing the contamination of the purge gas. An external reverse flow sensor to the purge gas is also eliminated. During normal purging, the pressure balance in the system is such that mass 42 is forced to the lower end of chamber 41.

While arms 31–34 preferably exhibit the relative impedances as described, it will be appreciated by those skilled in the art that the impedances of the arms can be changed considerably and the purge block in accordance with the present invention will still operate as intended, although the response time will change but will still be quite short. For example, if the impedances of the arms are equal, i.e. restrictions 43 and 44 are removed and the effective diameter of the gap around mass 42 is the same as the other three arms, the purge block still functions as described.

If there is excess flow from the bottle to port 38, the pressure drop across mass 42 is sufficient to lift it to the upper end of chamber 41, signalling an alarm condition. Considering a normal purge cycle, the impedance from port 35 to port 37 via arms 34 and 33 is twice the impedance from port 36 to port 37. Thus, the pressure on the upper side of mass 42 is greater than the pressure on the lower side and the mass does not move. If the valve on the bottle is not closed for the purge cycle, the pressure at port 36 is much higher than anywhere else in the block. Excessive gas flows from port 36 through arms 31, 34, and 33 to port 37, thereby raising mass 42 to signal an alarm. During normal operation, the gas from port 36 flows equally through the upper and lower arms of the purge block, i.e. the pressure at port 35 (closed) is the same as the pressure at port 37 (closed), and the pressure drop across mass 42 is insufficient to raise mass 42.

Figure 3:
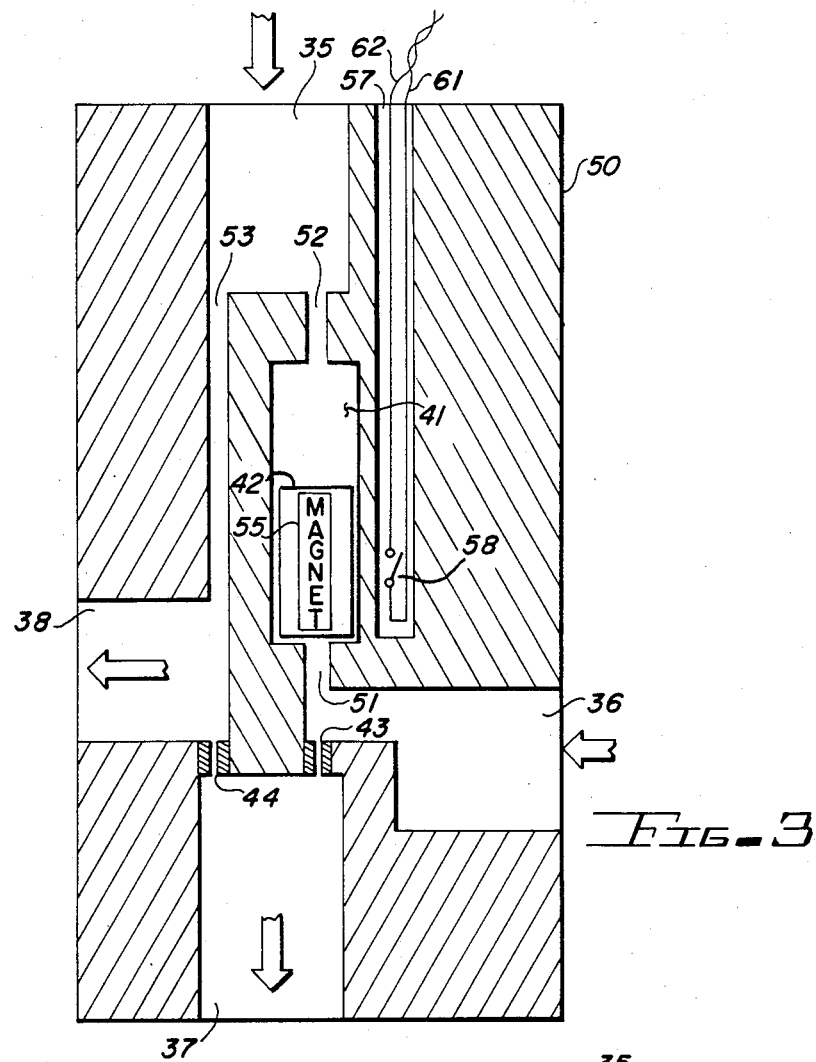
FIG. 3 illustrates in cross-section a simplified purge block in accordance with the present invention.

FIG. 3 illustrates a preferred embodiment of a purge block in accordance with the present invention. In FIG. 3, various elements have the same reference number as the corresponding elements schematically illustrated in FIG. 2. Purge block 50 comprises a block of suitable material, e.g. stainless steel, having a plurality of bores therein to form the various ports and passageways. Specifically, ports 35, 36, 37, and 38 each comprise a relatively large bore suitable for being threaded to receive an appropriate connector. Passageways 51 and 52 correspond to arm 31 in FIG. 2 and serve to connect port 36 to port 35 by way of elongated chamber 41. Within elongated chamber 41, which typically comprises a cylindrical bore, is mass 42 containing magnet 55 therein. In a preferred embodiment of the present invention, mass 42 comprises a Teflon cylinder having magnet 55 encapsulated therein. The diameter of the bore forming chamber 41 is slightly greater than the outside diameter of mass 42 so that mass 42 is freely moveable within the bore and gas can flow in the gap between mass 42 and the wall of chamber 41. Gravity urges mass 42 to the lower end of chamber 41.

In operation, if a sufficient pressure drop is developed across mass 42, the mass moves within chamber 41 to the upper end. Adjacent the lower end of chamber 41 is a magnetic sensing means comprising a magnetically actuated reed switch 58 located in bore 57. Reed switch 58 is connected to a suitable external circuit, well-known per se in the art, by way of electrical leads 61 and 62 to provide an indication of an alarm condition. Reed switch 58 may comprise either normally open or normally closed contacts, depending upon the type of circuit to which it is connected.

The passageway between port 36 and port 37, corresponding to arm 32, is provided with constricting means 43 which preferably comprises an insert having a bore therein of predetermined diameter. The insert can be threaded, press-fit, or otherwise secured within the passageway. A similar insert 44 connects port 37 with port 38. Arm 34 is formed in block 50 by passageway 53. Passageway 53 has the lowest impedance to the flow of gas and can simply comprise a bore of suitable diameter through block 50 which, at the lower end thereof, is filled by insert 44 to provide arm 33.

As a specific example of a preferred embodiment of the present invention, the following table lists the bore sizes for the respective passageways or chambers within block 50. This table is by way of example only and should not be construed as the only values suitable. The relative impedances are important, not their absolute value.

| ELEMENT | DIAMETER (Mils/mm) |
| --- | --- |
| 41 | 250/6.35 |
| 42 | 247/6.27 |
| 41 and 42 | 39/0.98* |
| 43 | 70/1.78 |
| 44 | 21/0.53 |
| 51 | 159/4.04 |
| 52 | 125/3.18 |
| 53 | 89/2.26 |

*effective diameter

A purge block constructed in accordance with the above provides a flow sensor which will be actuated by a pressure drop across mass 42 of one-fourth pound per square inch (1.7 kPa). This translates into a flow of one standard liter per minute at an applied (inlet) pressure of fifty pounds per square inch (345 kPa). The flow rate corresponding to this pressure drop varies with the applied pressure.

Figure 4:
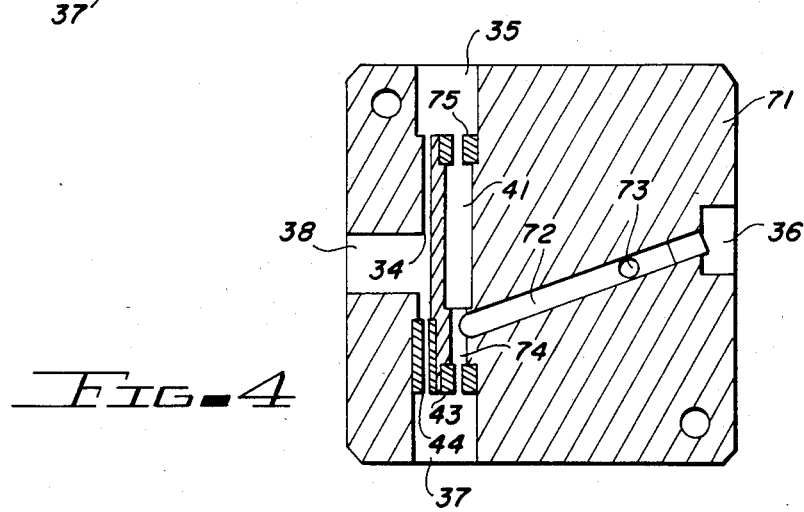
FIG. 4 illustrates the cross-section of an actual purge block in accordance with the present invention.

FIG. 4 illustrates a preferred embodiment of the present invention incorporating a high pressure valve into the port connected to the bottle of reactant gas. This high-pressure valve is electrically connected to the alarm circuitry for immediately shutting down the supply of reactant gas in the event of an error condition. FIG. 4 illustrates the actual construction of a purge block in accordance with the present invention. Specifically, ports 35–38 are formed by large diameter bores which do not extend through block 71. Arms 34 and 33 are formed by a through-bore from port 35 to port 37. Constriction 44 in arm 33 comprises an elongated insert having a bore therein of predetermined diameter. Similarly, chamber 41 is formed by a bore which does not extend entirely through block 71 and which is plugged at one end by insert 75 having a bore of predetermined diameter therein. Port 36 comprises an extended passageway 72 formed by a first bore which intersects bore 73 which extends from bore 72 to the top surface of block 71. Bore 72 intersects bore 74 which connects port 37 to chamber 41. At the lower end of bore 74 is insert 43 having a bore of predetermined diameter therein for providing the impedance for arm 32. The upper end of bore 74 forms passageway 51 into chamber 41.

A suitable high-pressure valve 23, as illustrated in FIG. 1, is connected to an outside surface of block 71 and communicates by way of bore 73 to bore 72. During normal operation, the high-pressure valve does not block bore 72 but permits the gas to flow from the supply bottle through the purge block. During an alarm condition, high-pressure valve 23 is actuated and closes bore 72, thereby preventing the flow of gas from the supply bottle through the purge block. After the error condition is corrected, high-pressure valve 23 must be reset.

Having thus described the invention, it will be apparent to those of skill in the art that a gas delivery system incorporating a purge block in accordance with the present invention greatly simplifies the construction, operation, maintenance, and repair of gas delivery systems. The single flow sensor within the purge block senses a number of error conditions and replaces a corresponding number of sensors which had been located elsewhere in gas cabinets of the prior art. Thus one not only eliminates the extra sensors, one substantially reduces the number of connections, further reducing the cost and complexity of the gas cabinet. The number of unprotected connections is substantially reduced as compared with systems of the prior art, as is the volume to be purged.

It will be apparent to those of skill in the art that various modifications can be made within the spirit and scope of the present invention. For example, while described in terms of a gas delivery system, it is understood by those of skill in the art that the present invention applies to any fluid system, i.e. systems for handling liquids are amenable to using a purge block in accordance with the present invention. The particular system used to sense the location of moveable mass 42 can be adapted to the particular application. For example, one may optically sense the presence of mass 42 by having it block or open a suitable optical path in the purge block. Mass 42 may comprise any suitable cross-sectional shape and does not require that a gap exists at all points between it and the wall of chamber 41. For example, mass 42 may comprise an irregular shape by which the walls of chamber 41 are contacted so as to hold mass 42 at either end of chamber 41 by virtue of static friction. The restoring force, provided by the weight of mass 42, and the size of the gap determine the pressure drop which will cause an error condition to be sensed. The variation of these parameters for adapting the present invention to a particular type of gas or liquid are easily determined empirically. The restoring force can be provided by a spring or by an oppositely poled magnet, which repels the magnet in mass 42, or other suitable means. While it is preferred to have the sensor detect the absence of mass 42, one could sense the presence of mass 42 at the upper end of chamber 41 instead. The impedances of the arms can have any value suited to the particular application. It is only required that the relative impedances are such that error conditions cause a sufficient pressure drop across mass 42 to move it to the other end of chamber 41.

We claim:

1. An apparatus comprising:
   first, second, third, and fourth port means;
   fluid conducting means for interconnecting said port means;
   said first and second port means serving as fluid inlet ports and said third or fourth port means serving as fluid outlet ports; and
   said conducting means interconnecting said first and second ports comprising flow sensing means for detecting which of said first and second ports is at a higher pressure than the other said conducting means also interconnecting said second and third ports, said third and fourth ports, and said first and fourth ports.

2. The apparatus as set forth in claim 1 wherein said fluid conducting means comprises four segments for interconnecting said four port means.

3. The apparatus as set forth in claim 2 wherein each of said four segments has a predetermined fixed impedance means to fluid flow.

4. The apparatus as set forth in claim 3 wherein the impedance of each segment is different from the others.

5. The apparatus as set forth in claim 4 wherein the first segment interconnects said first and second port means and comprises said detecting means, the second segment interconnects said second and third port means, the third segment interconnects said third and fourth port means, and the fourth segment interconnects said fourth and first port means, wherein the impedance of the third segment is greater than the impedance of the first segment, the impedance of the first segment is greater than the impedance of the second segment, and the impedance of the second segment is greater than the impedance of the fourth segment.

6. A purge block apparatus comprising:
   a block of material defining first, second, third, and fourth chambers and passageways therebetween;
   said first and second chambers each being connected by a first passageway, said third chamber being coupled to said fourth chamber by a second passageway, said fourth chamber being coupled to said first chamber by a third passageway, and said second chamber being coupled to said first chamber by a fourth passageway; and
   fluid pressure sensing means interposed in the passageway connecting said first and second chambers,
   wherein the impedance to fluid flow of the passageways connecting said chambers is chosen so that improper fluid flow through said passageways causes a pressure drop across said sensing means in excess of a predetermined amount.

7. The apparatus as set forth in claim 6 wherein said fluid pressure sensing means comprises means for indicating which of said first and second chambers is subject to the greater pressure.

8. The apparatus as set forth in claim 7 wherein said pressure sensing means indicates when the second chamber is subject to a pressure greater than the pressure in the first chamber by a predetermined amount.

9. The apparatus as set forth in claim 8 wherein the passageway connecting said third and fourth chambers incudes impedance means having a greater impedance to fluid flow than the sensing means.

10. The apparatus as set forth in claim 9 wherein said sensing means comprises:
    a sense chamber having first and second ends,
    a moveable mass, located at one end of said chamber, partially filling the cross-sectional area of said chamber; and
    means, located proximate said sense chamber, for detecting the location of said mass within said sense chamber.

11. The apparatus as set forth in claim 10 wherein said one end is connected to said second chamber and said other end is connected to said first chamber.

12. The apparatus as set forth in claim 11 wherein said mass comprises a magnet and wherein said means for detecting the location of said mass comprises a magnetically actuated switch.

13. The apparatus as set forth in claim 12 wherein said sensing means further comprises:

means for resiliently urging said mass toward said one end.

14. The apparatus as set forth in claim 9 wherein the passageway connecting the second and third chambers has impedance means wherein the impedance to fluid flow of the sensing means is greater than the impedance to fluid flow of the passageway connecting said second and third chambers, and the impedance to fluid flow of the passageway connecting said second and third chambers is greater than the impedance to fluid flow of the passageway connecting the first and fourth chambers.

15. The apparatus as set forth in claim 14 wherein at least one of said passageways comprises constricting means for determining the impedance to fluid flow thereof.

16. The apparatus as set forth in claim 15 wherein said constricting means comprises an insert having a through bore of predetermined diameter.

17. The apparatus as set forth in claim 11 or 16 and further comprising:
   valve means in said second chamber for controlling fluid flow from said second chamber to said first and third chambers.

18. A purge block for use in a gas system comprising:
   first, second, third and fourth ports located on the purge block;
   a first passage connecting the first and second ports and having a chamber therein;
   a second passage connecting the first and third ports;
   a third passage connecting the third and fourth ports;
   a fourth passage connecting the second and fourth ports;
   a moveable mass located at one end of the chamber for moving toward the other end of the chamber when the difference in pressure at the first port and the second port reaches a predetermined level; and
   means for sensing the location of the moveable mass.

19. The apparatus as set forth in claim 18 wherein said mass comprises a magnet and wherein said means for sensing the location of said mass comprises a magnetically actuated switch.

20. The apparatus as set forth in claim 18 wherein said first passage is characterized by an impedance to fluid flow which is greater than that of said second passage.

21. The apparatus as set forth in claim 20 and further comprising:
   means for resiliently urging said moveable mass toward said one end.

* * * * *